(12) United States Patent
Nakazawa

(10) Patent No.: US 8,004,737 B2
(45) Date of Patent: Aug. 23, 2011

(54) ELECTRIC-FIELD-SENSITIVE ELEMENT AND DISPLAY DEVICE USING THE SAME

(75) Inventor: Akira Nakazawa, Yokohama (JP)

(73) Assignee: Guala Technology Co., Ltd., Yokohama (JP)

( * ) Notice: Subject to any disclaimer, the term of this patent is extended or adjusted under 35 U.S.C. 154(b) by 51 days.

(21) Appl. No.: 12/312,252

(22) PCT Filed: Nov. 2, 2006

(86) PCT No.: PCT/JP2006/322011
§ 371 (c)(1),
(2), (4) Date: May 1, 2009

(87) PCT Pub. No.: WO2008/053561
PCT Pub. Date: May 8, 2008

(65) Prior Publication Data
US 2010/0067089 A1    Mar. 18, 2010

(51) Int. Cl.
*G02F 1/01* (2006.01)
*G02F 1/00* (2006.01)
(52) U.S. Cl. .................... 359/240; 359/321
(58) Field of Classification Search ............ 359/240, 359/265, 267, 274, 321
See application file for complete search history.

(56) References Cited

U.S. PATENT DOCUMENTS

| 6,165,388 A | 12/2000 | Coleman |
| 6,219,170 B1 | 4/2001 | Kimura et al. |

FOREIGN PATENT DOCUMENTS

| EP | 1 394 598 A1 | 3/2004 |
| EP | 2078980 A1 * | 7/2009 |
| JP | 62-150323 | 7/1987 |
| JP | 2-151838 | 6/1990 |
| JP | 2005-300705 | 10/2005 |

OTHER PUBLICATIONS

English language version of the International Search Report for International Application No. PCT/JP2006/322011, mailed Dec. 26, 2006.

European Search Report dated Jun. 30, 2010 and issued in corresponding European Patent Application 06822929.3.

* cited by examiner

*Primary Examiner* — David N Spector

(57) ABSTRACT

An electric-field-sensitive element (1) includes: an optical function layer (5) that includes a metal oxide selected from the group consisting of tin dioxide, titanium dioxide and zinc oxide, and an insulating material covering the metal oxide, the optical function layer (5) having a visible light transmittance that changes through application of an electric field; and a first and second electrode layer (7, 9) that sandwich the optical function layer (5) therebetween.

9 Claims, 4 Drawing Sheets

(A)

(B)

(C)

(A)

(B)

(C)

ELECTRIC-FIELD-SENSITIVE ELEMENT AND DISPLAY DEVICE USING THE SAME

CROSS REFERENCE TO RELATED APPLICATION

This application claims the benefit under 35 U.S.C. Section 371, of PCT International Application No. PCT/JP2006/322011, filed Nov. 2, 2006, the disclosure of which is hereby incorporated by reference.

TECHNICAL FIELD

The present invention relates to an element having a visible light transmittance value that can be controlled through application of an electric field, and a display device to which such an element is applied.

BACKGROUND ART

Liquid crystals and electrochromic substances are known as materials that change their optical transmittance values in response to an electric field applied thereto. Liquid crystals have already been widely used in displays. Electrochromic substances are substances that exhibit chromism (reversible color change) through an electrochemical oxidation-reduction reaction, and can be considered as finding various applications including in a paper-like display (so-called "electronic paper"). Materials of this kind, which are sensitive to electric fields, are advantageous in that they can be more easily controlled than substances that are sensitive to light or heat, in terms of the configuration of their control means.

Although many electrochromic substances are high molecular weight compounds that are chemically synthesized, JP 2000-502398W discloses that tin oxide doped with antimony or niobium exhibits electrochromism. This publication reports that a cyclic color change following an electric signal of 50 mHz occurred (the response speed in this case is 20 seconds). The above-mentioned publication also describes that mixing a light-colored pigment such as titanium dioxide, silica, or alumina with doped tin oxide is effective in improving contrast.

Patent Document 1: JP 2000-502398W

DISCLOSURE OF THE INVENTION

In terms of application in displays, electrochromic substances are superior to liquid crystals in transparency in a translucent state and power consumption, since they do not require a polarizing plate or a backlight. However, electrochromism involves ion migration through an electrolyte, and, therefore, it is presumably difficult to increase the response speed of the sensitivity of an electrochromic substance to the same level or higher than that in a liquid crystal. The response speed in a typical liquid crystal in a color change between white and black is 10 to 20 ms.

The present invention provides a novel electric-field-sensitive element that contains a metal oxide and that undergoes rapid transition between states with different visible light transmittance values. An electric-field-sensitive element according to the present invention includes an optical function layer that includes a metal oxide selected from the group consisting of tin dioxide, titanium dioxide and zinc oxide, and an insulating material covering the metal oxide, the optical function layer having a visible light transmittance value that changes through application of an electric field; and a first electrode layer and a second electrode layer that sandwich the optical function layer.

A display device provided by the present invention includes a support having a light surface color; a first translucent electrode layer fixed to the support; an optical function layer covering the first translucent electrode layer; and a second translucent electrode layer laminated on the optical function layer. The optical function layer includes a metal oxide selected from the group consisting of tin dioxide, titanium dioxide and zinc oxide, and an insulating material covering the metal oxide, and has a visible light transmittance value that changes through application of an electric field.

A production method provided by the present invention includes the steps of: coating the first electrode layer fixed to a support with a translucent layer made of the metal oxide and an insulating material covering said metal oxide; irradiating the translucent layer with ultraviolet light, thereby altering the translucent layer to form the optical function layer; and fixing the second electrode layer to the optical function layer.

BEST MODE FOR CARRYING OUT THE INVENTION

The present inventor found that, when a translucent metal oxide that is a semiconductor having a band gap of 3.2 eV or more is given an effective excitation energy in a state in which it is provided with an insulating coating, the metal oxide turns into a substance having a visible light transmittance value that changes through application of an electric field. Tin dioxide ($SnO_2$), titanium dioxide ($TiO_2$) and zinc oxide (ZnO) correspond to the above-described metal oxide. Examples of the material for the insulating coating include thermoplastic resins such as polyethylene, polypropylene, polystyrene, polybutadiene, polyvinyl chloride, polymethyl methacrylate, polyamide, polycarbonate, polyimide and cellulose acetate, as well as thermosetting resins such as phenol resin, amino resin, unsaturated polyester resin, allyl resin, alkyd resin, epoxy resin, polyurethane and silicon resin. Other examples include silicone (polysiloxane), paraffin, mineral oil, magnesium oxide (MgO), silicon dioxide ($SiO_2$) and alumina ($Al_2O_3$).

Figure 1:
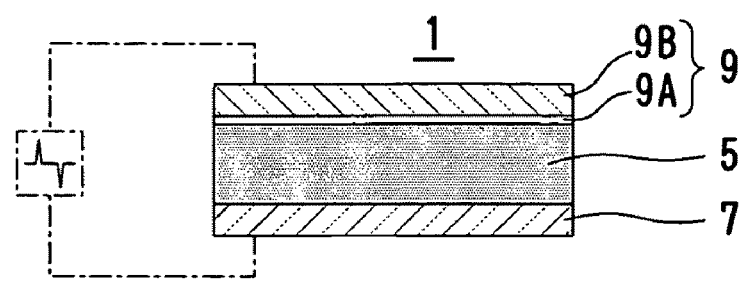
FIG. 1 is a cross-sectional view showing the configuration of an electric-field-sensitive element according to an example of the present invention.

Sandwiching the above-mentioned substances between electrode layers having different materials as shown in FIG. 1 can provide an electric-field-sensitive element 1 having a visible light transmittance value that reversibly changes. In FIG. 1, the electric-field-sensitive element includes an optical function layer 5 having a visible light transmittance value that changes through application of an electric field, a first electrode layer 7 and a second electrode layer 9. In the illustrated example, the first electrode layer 7 is made up of a single layer, whereas the second electrode layer 9 is made up of a lower layer 9A having a material different from that of the first electrode layer 7 and an upper layer 9B having the same material as that of the first electrode layer 7. However, it is also possible to form the lower layer 9A in a sufficiently large thickness, and to omit the upper layer 9B.

In the layer structure shown in FIG. 1, the lower layer 9A serves to prevent unnecessary electron injection from the upper layer 9B into the optical function layer 5. By using different materials for the two conductors that are in contact with the optical function layer 5, it is possible to cause a reversible state change.

Figure 2:
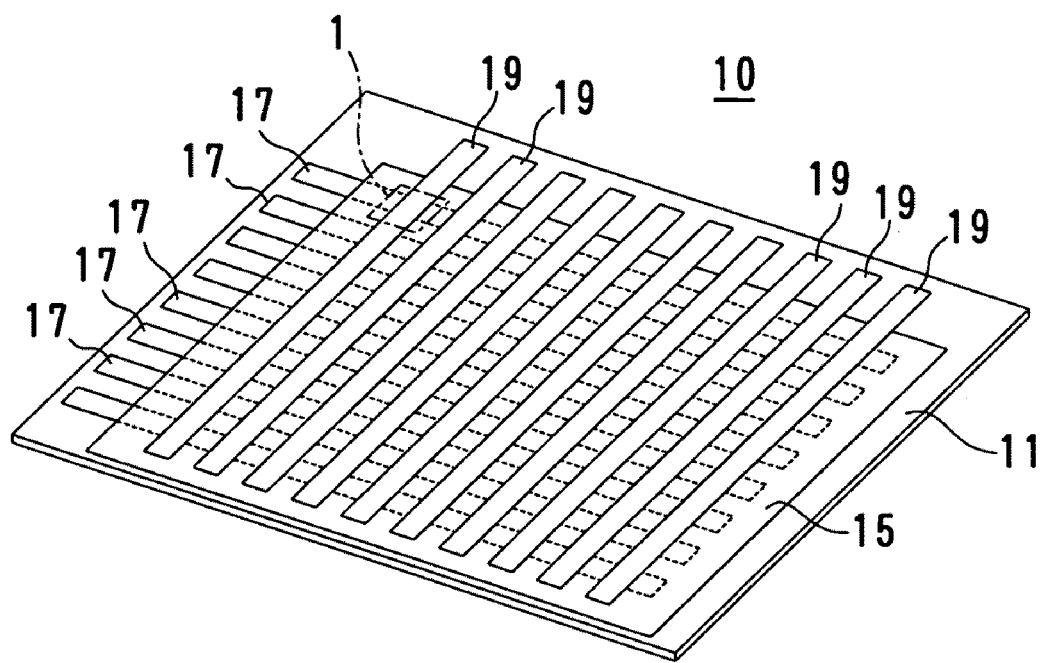
FIG. 2 is a perspective view showing the configuration of a display device according to an example of the present invention.

A reflective display device 10 as shown in FIG. 2 is one application example of the electric-field-sensitive element 1. The display device 10 includes a substrate 11 having a light surface color, band-shaped first electrodes 17 that are fixed to the substrate 11 and are arranged parallel to each other, an optical function layer 15, and band-shaped second electrodes 19 that are fixed to the optical function layer 15 and are arranged parallel to each other. The first electrodes 17 and the second electrodes 19 intersect to form an electrode matrix. The electric-field-sensitive element 1 corresponds to each of the intersecting points of the electrode matrix. That is, part of the first electrodes 17, part of the optical function layer 15, and part of the second electrodes 19 correspond to the first electrode layer 7, the optical function layer 5, and the second electrode layer 9, respectively. In FIG. 1, the position of a single electric-field-sensitive element 1 is indicated by a quadrangle formed by a dashed-dotted line.

With the display device 10, a matrix display can be provided by controlling the amount of external light reflected at the substrate 11 on an element-by-element basis. For a configuration in which the light to be controlled passes through the electric-field-sensitive element 1 in the direction in which the layers are laminated as in this application example, it is necessary to provide a translucent conductive layer made of, for example, indium tin oxide (hereinafter, referred to as "ITO") as the first and second electrode layers 7 and 9 of the electric-field-sensitive element 1. In the case where the first electrode layer 7 is ITO, it is preferable to use a transparent semiconductor as the material of the lower layer of the second electrode layer 9.

A method for producing the display device 10 and the electric-field-sensitive element included therein includes Steps 1 to 4 below.

In Step 1, the first electrodes 17 are arranged on the substrate 11 serving both as a support and a reflective member.

In Step 2, the first electrodes 17 fixed to the substrate 11 are coated with a translucent layer made up of a metal oxide and an insulating material covering the metal oxide. The metal oxide is a compound selected from the group consisting of tin dioxide, titanium dioxide and zinc oxide.

In Step 3, the translucent layer is irradiated with ultraviolet light, and, thereby, the translucent layer is altered to form an optical function layer 15 that exhibits chromism. The alteration is considered to occur due to the formation of energy levels in the metal oxide as a result of ultraviolet excitation as described below.

In Step 4, the second electrodes 19 are arranged on the optical function layer 15.

In the following, a specific example of the electric-field-sensitive element 1 will be described.

Example 1

In Example 1, an optical function layer 5 is formed from tin dioxide ($SnO_2$), which is a metal oxide, and silicone oil, which is an insulator. The optical function layer 5 has a thickness of 1 μm. The first electrode layer 7 is ITO having a thickness of 0.4 μm. The lower layer 9A of the second electrode layer 9 is nickel oxide (NiO) having a thickness of 0.1 μm, and the upper layer 9B is ITO having a thickness of 0.4 μm.

After the first electrode layer 7 was formed on a sheet of white glass as a support having a thickness of 1 mm by sputtering, the optical function layer 5 was formed by the following procedure. A mixed solution of 0.75 g of tin caproate, 1.28 g of xylene and 0.1 g of silicone oil (TSF433 manufactured by Toshiba Silicone) was prepared. The above-mentioned mixed solution was applied by a spin-on process (1200 rpm, 10 sec) onto the sheet of white glass to which the first electrode layer 7 was fixed, and the whole was exposed to an ambient temperature of 50° C. for 10 minutes to dry, and then fired. The firing temperature was 320° C., and the firing time was 10 minutes. Then, the fired layer was irradiated with ultraviolet light using a low-pressure mercury lamp. The irradiation was carried out under the conditions of 200 mW/cm$^2$ for 60 mins.

After the optical function layer 5 was formed, the lower layer 9A and the upper layer 9B were laminated sequentially by sputtering, completing the production of the electric-field-sensitive element 1.

In order to confirm the optical functionality of the electric-field-sensitive element 1, voltage pulse signals were applied to the electric-field-sensitive element 1. At that time, the first electrode layer 7 was connected to the potential output terminal of a pulse generator, and the second electrode layer 9 (strictly speaking, the upper layer 9B) was connected to the ground terminal. As shown in the upper half of FIG. 3(A), a positive pulse having an amplitude of +10 V and a pulse width of 20 ms, and a negative pulse having an amplitude of −20 V and a pulse width of 20 ms were repeatedly applied at an interval of approximately 500 ms. Concurrently therewith, the transmittance of the electric-field-sensitive element 1 to visible light was measured using a measuring instrument having a light-emitting diode (LED) as a light source.

Figure 3:
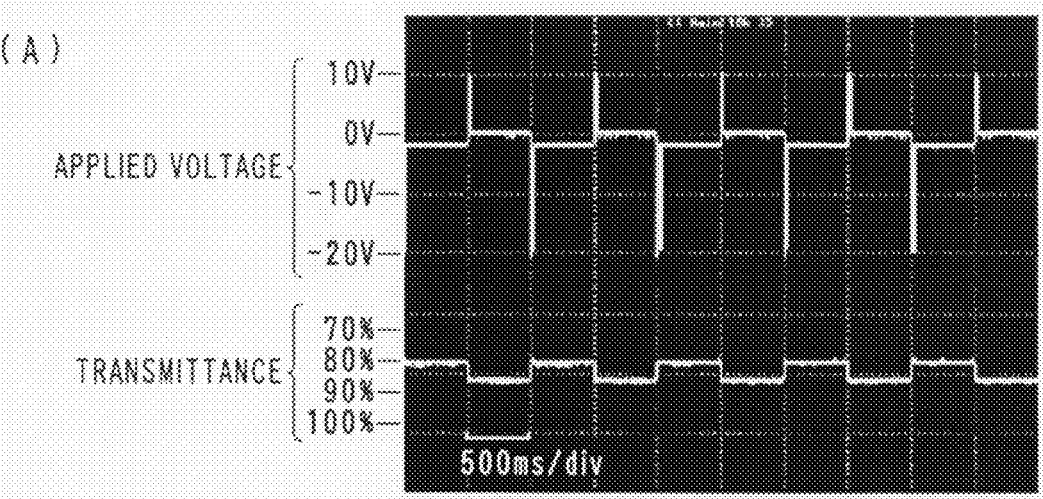
FIG. 3 shows photographs of oscilloscope waveforms showing the responsiveness of an electric-field-sensitive element according to a first example of the present invention.
Figure 3:
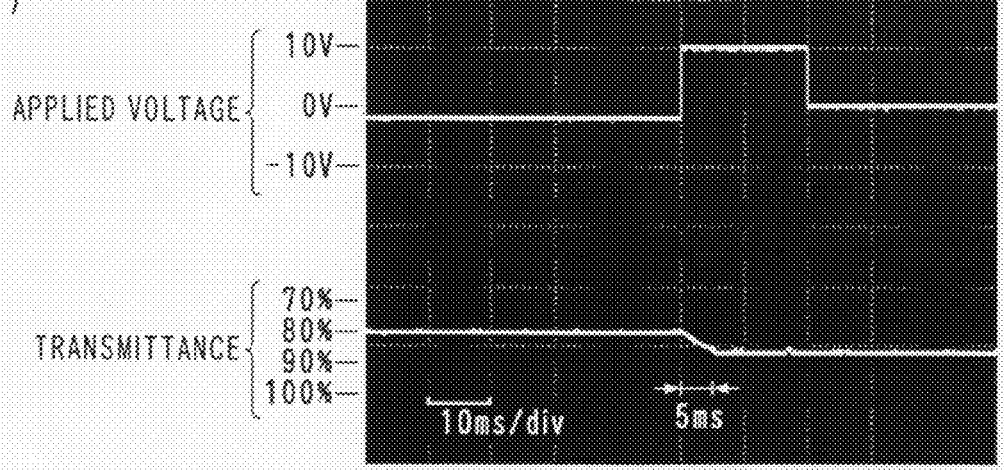
Figure 3:
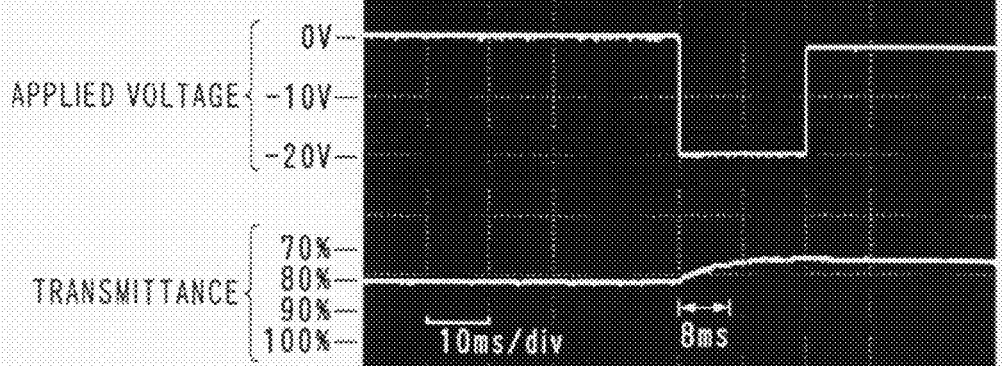

As shown in the lower half of FIG. 3(A), the transmittance value cyclically changed in response to the repeatedly applied pulses. A state change in which the transmittance value decreased (this is referred to as "coloring") occurred in response to the negative pulse, and a state change in which the transmittance value increased (this is referred to as "decoloring") occurred in response to the positive pulse. During the interval period of the pulse application, the state at the end of the immediately preceding change was maintained. The transmittance at the end of coloring was 80%, and the transmittance at the end of decoloring was 86%. From FIG. 3(A), it can be seen that the electric-field-sensitive element 1 according to Example 1 exhibits chromism.

FIG. 3(B) is a waveform chart in which the scale of the time axis of FIG. 3(A) is magnified, showing the responsiveness to the positive pulse. The response time during decoloring was 5 ms.

FIG. 3(C) is also a waveform chart in which the scale of the time axis of FIG. 3(A) is magnified, showing the responsiveness to the negative pulse. The response time during coloring was 8 ms.

Example 2

In Example 2, the optical function layer 5 is formed from titanium dioxide ($TiO_2$), which is a metal oxide, and silicone oil, which is an insulator. The optical function layer 5 has a thickness of 1 μm. The materials, thicknesses and the formation methods of the first electrode layer 7 and the second electrode layer 9 are the same as those in Example 1 described above.

The optical function layer 5 was formed by the following procedure. A mixed solution of 0.72 g of titanium caproate, 1.14 g of xylene, 0.14 g of butyl cellosolve and 0.25 g of silicone oil (TSF433 manufactured by Toshiba Silicone) was prepared. The above-mentioned mixed solution was applied by a spin-on process (600 rpm, sec) onto a sheet of white glass to which the first electrode layer 7 was fixed, and the whole was exposed to an ambient temperature of 50° C. for 10 minutes to dry, and then fired. The firing temperature was 320° C., and the firing time was 10 minutes. Then, the fired layer was irradiated with ultraviolet light using a low-pressure mercury lamp. The irradiation was carried out under the conditions of 200 mW/cm$^2$ for 60 mins, as in Example 1.

The optical functionality of the electric-field-sensitive element 1 was confirmed in the same manner as in Example 1. That is, as shown in the upper half of FIG. 4(A), a positive pulse having an amplitude of +10 V and a pulse width of 20 ms, and a negative pulse having an amplitude of −20 V and a pulse width of 20 ms were repeatedly applied at an interval of approximately 500 ms. Concurrently therewith, the transmittance of the electric-field-sensitive element 1 to visible light was measured using a measuring instrument having an LED as a light source.

Figure 4:
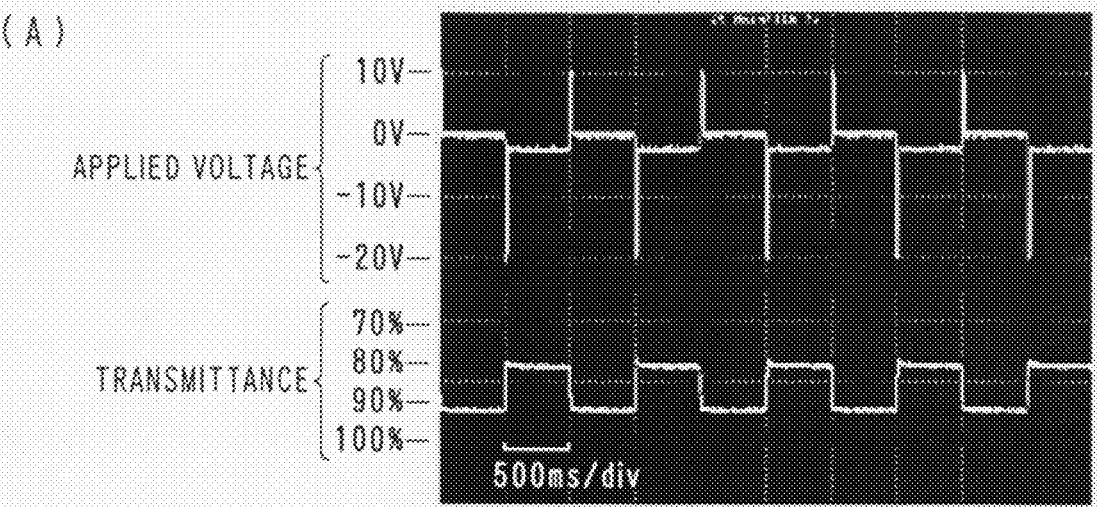
FIG. 4 shows photographs of oscilloscope waveforms showing the responsiveness of an electric-field-sensitive element according to a second example of the present invention.
Figure 4:
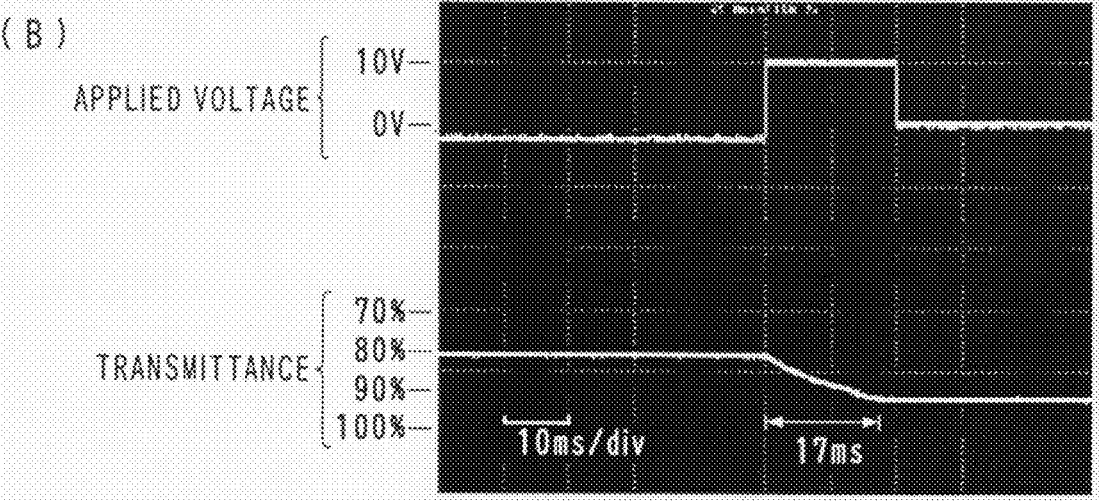
Figure 4:
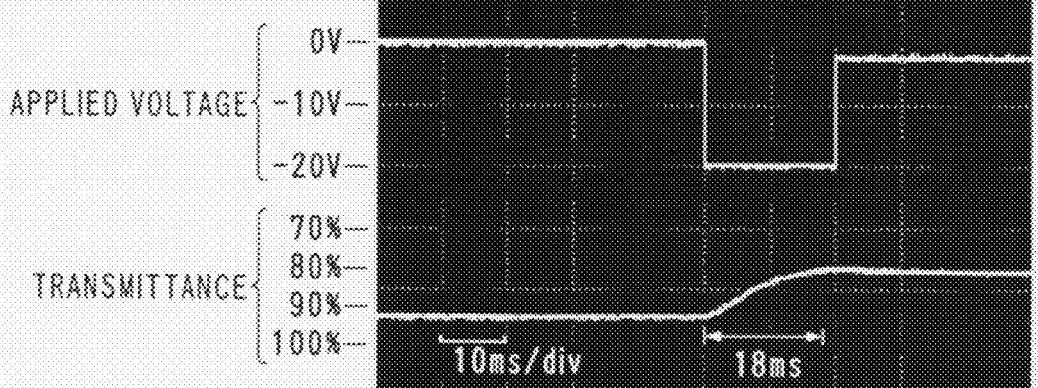

As shown in the lower half of FIG. 4(A), the transmittance value cyclically changed in response to the repeatedly applied pulses. A state change in which the transmittance value decreased (coloring) occurred in response to the negative pulse, and a state change in which the transmittance value increased (decoloring) occurred in response to the positive pulse. During the interval period of the pulse application, the state at the end of the immediately preceding change was maintained. The transmittance at the end of coloring was 79%, and the transmittance at the end of decoloring was 92%. From FIG. 4(A), it can be seen that the electric-field-sensitive element 1 according to Example 2 exhibits chromism.

FIG. 4(B) is a waveform chart in which the scale of the time axis of FIG. 4(A) is magnified, showing the responsiveness to the positive pulse. The response time during decoloring was 17 ms.

FIG. 4(C) is also a waveform chart in which the scale of the time axis of FIG. 4(A) is magnified, showing the responsiveness to the negative pulse. The response time during coloring was 18 ms.

Example 3

A mixed solution of 2 g of tin caproate, 3 g of xylene and 0.5 g of silicone oil (TSF433 manufactured by Toshiba silicone) was prepared, and the mixed solution was subjected to application, drying, firing, and ultraviolet irradiation as in Example 1, thereby forming the optical function layer 5.

The second electrode layer 9 was grounded, and a negative pulse having an amplitude of −20 V and a pulse width of 10 ms was applied to the first electrode layer 7. In response to the pulse application, the transmittance value of the electric-field-sensitive element 1 changed from 85% to 56%. Thereafter, during the period in which the applied voltage was 0, the transmittance value was maintained at 56%.

Example 4

The same mixed solution as that of Example 3 was prepared. After application, the solution was more rapidly dried than in Example 3. Except for this, the same procedure as in Example 3 was followed.

By drying the applied mixed solution rapidly, gaps were left as a result of the evaporation of the solvent, and the fired layer thus formed a particle aggregate. The porous optical function layer 5 provided improved contrast. The transmittance value of the electric-field-sensitive element 1 changed from 85% to 24% in response to the same pulse application as in Example 3.

Figure 5:
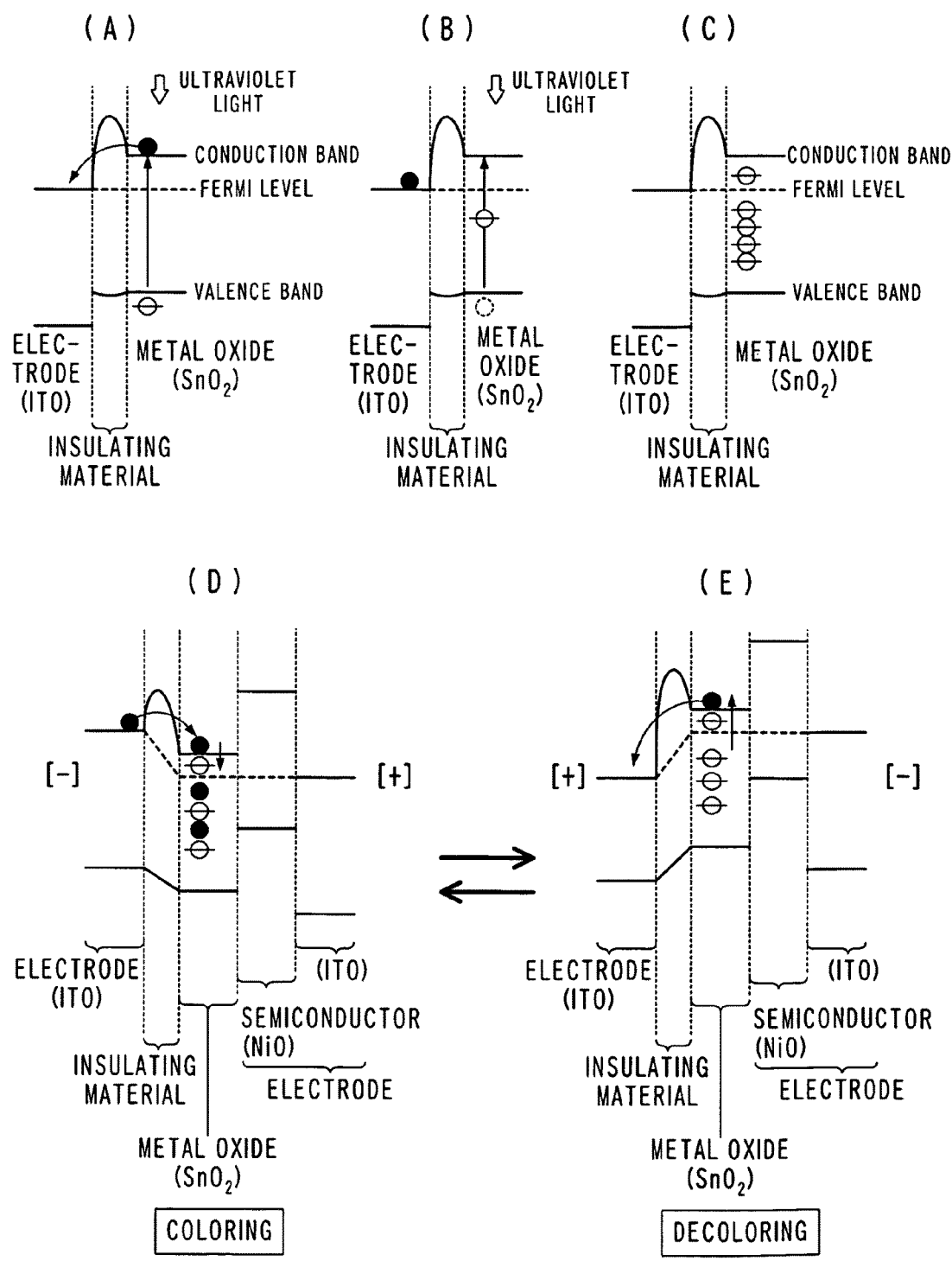
FIG. 5 illustrates the operation principles of an electric-field-sensitive element according to an example of the present invention.

The chromism confirmed in the above examples seems to be based on the operation principles shown in FIG. 5. Although tin dioxide is given as an example, the following description also applies to titanium dioxide and zinc oxide.

As shown in FIG. 5(A), when tin dioxide (amorphous), which is a metal oxide, on the ITO serving as one electrode is irradiated with ultraviolet light, an electron in the valence band of the tin dioxide is excited to the conduction band. In the vicinity of the interface with the ITO, this electron passes through the insulator with a certain probability and is temporarily captured by the ITO, resulting in a change in the interatomic distance at the site of the valence band from which the electron has been extracted. Although the captured electron goes back to the valence band of the tin dioxide again, its level has moved into the band gap at this time, as shown in FIG. 5(B). Such a phenomenon repeatedly occurs, and many levels are created within the band gap during ultraviolet irradiation as shown in FIG. 5(C). However, electrons that should be captured at these levels are excited by ultraviolet light, and move to the ITO. The resulting levels within the band gap that contain no electrons remain even after completion of the ultraviolet irradiation. The energy of the light (wavelength) absorbed by metal oxides is dependent on the levels within the band gap. In the case of tin dioxide, the transmittance value is large when there are few electrons within the band gap (transparent state).

The role of the insulator is to form a barrier between the ITO and the tin dioxide, thereby allowing passage of an excited electron. By being subjected to ultraviolet irradiation in a state in which the insulator is disposed between the ITO and the tin dioxide, the tin dioxide undergoes a structural change.

When an electric field is applied to the tin dioxide in a transparent state in which it has levels within the band gap in a biased manner as shown in FIG. 5(D), an electron from the ITO passes beyond the barrier formed by the insulator and moves to the tin dioxide. When the electron that has moved is captured at a level within the band gap of the tin dioxide, the transmittance value of the tin dioxide decreases. That is, the state changes from the transparent state to a state in which a dark color is exhibited. Even after removing the electric field, the dark colored state is maintained by the electric charge held by the barrier.

When an electric field with the reverse polarity as the above-mentioned field is applied as shown in FIG. 5(E), the electron that has been captured in the band gap turns into a free electron in the conduction band with a certain probability, under external light having an amount of light approximately at the level of interior illumination provided, for example, by a fluorescent light source. This free electron moves to the ITO. This eventually causes a state in which there is no electron in a level of the band gap. Accordingly, the state of the tin oxide is brought back from the dark colored state to the transparent state.

According to the foregoing examples, the transmittance value is large in a state in which decoloring has occurred, and it is therefore possible to realize a reflective display device with high contrast and a bright background. The main component of the electric-field-sensitive element 1 is solid and, therefore, damage resulting from a mechanical impact tends not to occur as much as compared with a configuration composed entirely of a liquid or containing a large amount of liquid. Since the structure is simple, the present invention advantageously reduces costs.

In the production method according to the foregoing examples, the insulator is limited to a heat-resistant material that can withstand firing; however, in the case of using a method in which silicone oil is removed by washing after firing and a resin is newly packed, it is possible to use a resin such as an acrylic resin, a polycarbonate resin and an epoxy resin.

An electric-field-sensitive element of the present invention that can be implemented by the foregoing examples and modifications thereof has the following applications.

Since the amount of change in transmittance is proportional to the voltage applied, it is possible to realize a gray-scale representation through multi-valued control of the applied voltage. It is also possible to realize a full-color representation as that achieved with liquid crystals, by using a backlight and a filter.

It is also possible to form an optical function layer 5 having a structure that has been partially changed by ultraviolet irradiation in an arbitrary pattern, and to display an arbitrary shape depending on the combination of the irradiation pattern and the pattern of the electrode layer.

As a modification of the display device 10, a substrate obtained by fixing a reflective film to a base material having rigidity or flexibility through lamination or painting can be used as the support of the electric-field-sensitive element 1.

The configuration, material properties, method pertaining to the production thereof, materials thereof, and so on of the electric-field-sensitive element 1 and the display device 10 are not limited to the illustrated examples, and may be changed as necessary within the scope in accordance with the gist of the present invention.

INDUSTRIAL APPLICABILITY

The present invention is useful in power-saving displays that consume power substantially only when the displayed content is updated. The invention is also applicable to other displays and various optical function devices including an optical shutter.

The invention claimed is:

1. An electric-field-sensitive element comprising:
   an optical function layer that includes a metal oxide selected from the group consisting of tin dioxide, titanium dioxide and zinc oxide, and an insulating material covering the metal oxide, the optical function layer having a visible light transmittance value that changes through application of an electric field; wherein during formation of the electric-field-sensitive element, the optical function layer is irradiated with ultraviolet light so that the optical function layer has levels within a band gap that contain no electrons after the irradiation with ultraviolet light; and
   the electric-field-sensitive element further comprises a first electrode layer and a second electrode layer that sandwich the optical function layer therebetween.

2. The electric-field-sensitive element according to claim 1,
   wherein the insulating material covering the metal oxide is formed of a particle aggregate.

3. The electric-field-sensitive element according to claim 1,
   wherein chromism is exhibited.

4. The electric-field-sensitive element according to claim 3,
   wherein the first electrode layer has a material different from that of the second electrode layer.

5. The electric-field-sensitive element according to claim 4,
   wherein the first electrode layer is made of a transparent conductive material that is different from the metal oxide, and
   the second electrode layer is made of a p-type semiconductor at least in a portion thereof in contact with the optical function layer.

6. The electric-field-sensitive element according to claim 5,
   wherein the first electrode layer is made of indium tin oxide,
   the metal oxide is titanium dioxide, and
   the second electrode layer is made of nickel oxide in the portion thereof in contact with the optical function layer.

7. The electric-field-sensitive element according to claim 5,
   wherein the first electrode layer is made of indium tin oxide,
   the metal oxide is tin dioxide, and
   the second electrode layer is made of nickel oxide in the portion thereof in contact with the optical function layer.

8. A display device comprising:
   a support having a light surface color;
   a first translucent electrode layer fixed to the support;
   an optical function layer covering the first translucent electrode layer; and
   a second translucent electrode layer laminated on the optical function layer,
   wherein the optical function layer includes a metal oxide selected from the group consisting of tin dioxide, titanium dioxide and zinc oxide, and an insulating material covering the metal oxide, and has a visible light transmittance value that changes through application of an electric field, and
   wherein, during formation of the display device, the optical function layer is irradiated with ultraviolet light so that the optical function layer has levels within a band pap that contain no electrons after the irradiation with ultraviolet light.

9. A method for producing an electric-field-sensitive element comprising an optical function layer that includes a metal oxide selected from the group consisting of tin dioxide, titanium dioxide and zinc oxide, and an insulating material covering the metal oxide, the optical function layer having a visible light transmittance value that changes through application of an electric field, and a first electrode layer and a second electrode layer that sandwich the optical function layer therebetween, the method comprising:
   coating the first electrode layer fixed to a support with a translucent layer made of the metal oxide and an insulating material covering said metal oxide;
   irradiating the translucent layer with ultraviolet light, thereby altering the translucent layer to form the optical function layer; and
   fixing the second electrode layer to the optical function layer.

* * * * *

UNITED STATES PATENT AND TRADEMARK OFFICE
CERTIFICATE OF CORRECTION

| | | |
|---|---|---|
| PATENT NO. | : 8,004,737 B2 | Page 1 of 1 |
| APPLICATION NO. | : 12/312252 | |
| DATED | : August 23, 2011 | |
| INVENTOR(S) | : Akira Nakazawa | |

It is certified that error appears in the above-identified patent and that said Letters Patent is hereby corrected as shown below:

Column 8, Line 44 (Approx.), in claim 8, delete "pap" and insert -- gap --, therefor.

Signed and Sealed this
Seventh Day of February, 2012

David J. Kappos
*Director of the United States Patent and Trademark Office*